US012810500B2

(12) United States Patent
Matsumoto et al.

(10) Patent No.: US 12,810,500 B2
(45) Date of Patent: Nov. 24, 2026

(54) INFORMATION PROCESSING DEVICE AND DISPLAY CONTROL METHOD

(71) Applicant: Rakuten Group, Inc., Tokyo (JP)

(72) Inventors: Asaki Matsumoto, Tokyo (JP); Takayoshi Inuma, Tokyo (JP)

(73) Assignee: Rakuten Group, Inc., Tokyo (JP)

( * ) Notice: Subject to any disclaimer, the term of this patent is extended or adjusted under 35 U.S.C. 154(b) by 172 days.

(21) Appl. No.: 18/763,583

(22) Filed: Jul. 3, 2024

(65) Prior Publication Data

US 2026/0057786 A1 Feb. 26, 2026

(30) Foreign Application Priority Data

Jul. 31, 2023 (JP) ................................ 2023-124070

(51) Int. Cl.

*G08G 5/26* (2025.01)
*G06T 3/40* (2024.01)
*G06T 11/60* (2026.01)
*G08G 5/80* (2025.01)

(52) U.S. Cl.

CPC ................ *G08G 5/26* (2025.01); *G06T 3/40* (2013.01); *G06T 11/60* (2013.01); *G08G 5/80* (2025.01)

(58) Field of Classification Search

CPC .. G08G 5/26; G08G 5/80; G08G 5/21; G08G 5/25; G08G 5/53; G08G 5/55; G08G 5/57; G08G 5/59; G08G 5/723; G08G 5/727; G06T 3/40; G06T 11/60

See application file for complete search history.

(56) References Cited

U.S. PATENT DOCUMENTS

| | | | | |
|---|---|---|---|---|
| 10,733,880 | B2 * | 8/2020 | Gomez Gutierrez .. | B64U 50/35 |
| 2015/0262492 | A1 * | 9/2015 | Barnes .................. | B64D 47/08 701/301 |
| 2016/0318446 | A1 * | 11/2016 | Van Steenkist ........ | B60Q 9/008 |
| 2018/0352375 | A1 * | 12/2018 | Burgess ............... | G01C 21/005 |
| 2022/0366802 | A1 * | 11/2022 | Sato ......................... | G08G 5/22 |

FOREIGN PATENT DOCUMENTS

| | | | |
|---|---|---|---|
| JP | 2003-132499 | A | 5/2003 |
| JP | 2007-34714 | A | 2/2007 |
| JP | 2007034714 | A * | 2/2007 |
| WO | 2021/131037 | A1 | 7/2021 |

OTHER PUBLICATIONS

English Translation of Japanese Communication dated Sep. 11, 2024 in Application No. 2023-124070.

* cited by examiner

*Primary Examiner* — Khoi H Tran
*Assistant Examiner* — Tristan J Greiner
(74) *Attorney, Agent, or Firm* — Sughrue Mion, PLLC

(57) ABSTRACT

An UAV monitoring server acquires position information indicating a position and direction information indicating a front direction of each of a plurality of UAVs in flight, and in a case where the plurality of UAVs includes two or more UAVs in which a distance between the positions is less than or equal to a predetermined first threshold value and the front directions are facing each other, causes information urging caution to be displayed in association with respective UAV objects of the two or more UAVs on a two-dimensional map screen.

10 Claims, 14 Drawing Sheets

FIG. 9

| SPEED DIFFERENCES | SPEEDS OF FASTER UAV | DISPLAY MODES | |
|---|---|---|---|
| SMALL<br>※DIFFERENCE≦1m/s<br>(e.g., :5m/s AND 5.5m/s) | HIGH SPEED<br>※FASTER THAN 8m/s | FIGURES ARE SAME SIZE & DISPLAY IN RED | 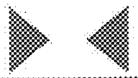 |
| | MEDIUM SPEED<br>※8m/s OR LESS | FIGURES ARE SAME SIZE & DISPLAY IN YELLOW |  |
| | LOW SPEED<br>※3m/s OR LESS | FIGURES ARE SAME SIZE & DISPLAY IN LIGHT BLUE |  |
| MEDIUM<br>※1m/s<DIFFERENCE≦2m/s<br>(e.g.,:5m/s AND 7m/s) | HIGH SPEED<br>※FASTER THAN 8m/s | FIGURE WITH FASTER SPEED IS LARGER & DISPLAY IN RED |  |
| | MEDIUM SPEED<br>※8m/s OR LESS | FIGURE WITH FASTER SPEED IS LARGER & DISPLAY IN YELLOW | 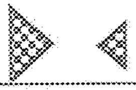 |
| | LOW SPEED<br>※3m/s OR LESS | FIGURE WITH FASTER SPEED IS LARGER & DISPLAY IN LIGHT BLUE | 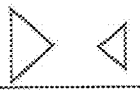 |
| LARGE<br>※2m/s<DIFFERENCE<br>(e.g.,:5m/s AND 8m/s) | HIGH SPEED<br>※FASTER THAN 8m/s | FIGURE WITH FASTER SPEED IS FURTHER LARGER & DISPLAY IN RED | 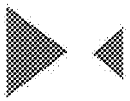 |
| | MEDIUM SPEED<br>※8m/s OR LESS | FIGURE WITH FASTER SPEED IS FURTHER LARGER & DISPLAY IN YELLOW | 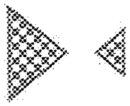 |
| | LOW SPEED<br>※3m/s OR LESS | FIGURE WITH FASTER SPEED IS FURTHER LARGER & DISPLAY IN LIGHT BLUE | 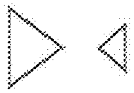 |

FIG. 12
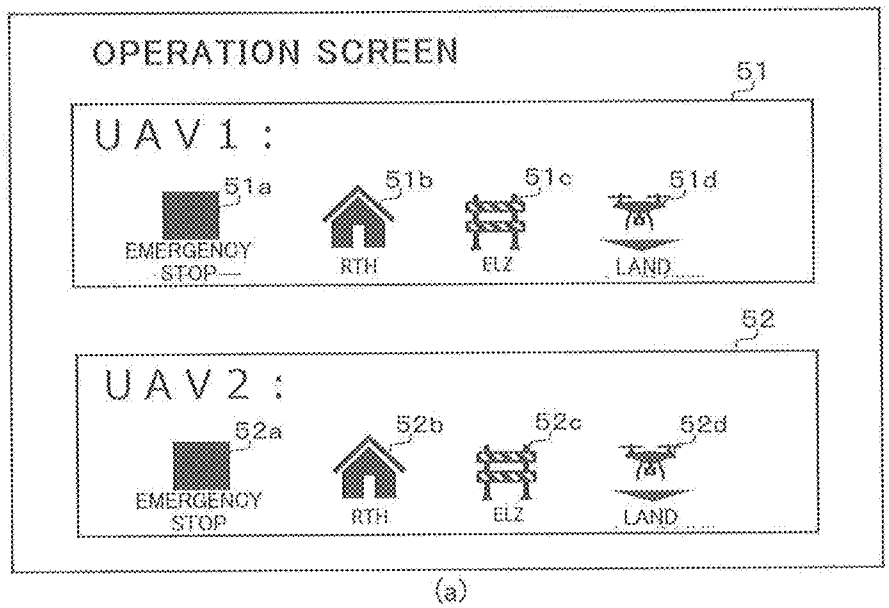
(a)
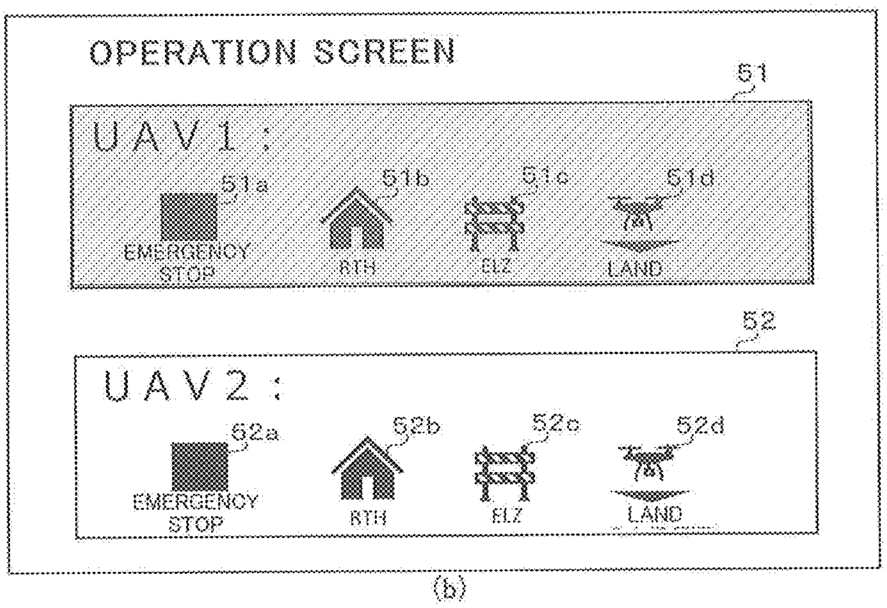
(b)

INFORMATION PROCESSING DEVICE AND DISPLAY CONTROL METHOD

CROSS REFERENCE TO RELATED APPLICATION

This application claims priority from Japanese Patent Application No. 2023-124070 which was filed on Jul. 31, 2023, the disclosure of which is herein incorporated by reference in its entirety.

TECHNICAL FIELD

One or more embodiments of the present invention relate to a technical field of a system that enable proper monitoring of a flight status of an unmanned aerial vehicle by displaying information indicating the unmanned aerial vehicle on a map screen.

RELATED ART

Conventionally, as disclosed in, for example, JP 2003-132499 A, a technique in which a distance between two adjacent aircrafts is obtained, and when it is determined that a distance between the aircrafts is smaller than a safety interval, a monitoring required mark is displayed on a display screen, is known. The monitoring required mark consists of a triangle with three vertices: aircraft symbols corresponding to two adjacent aircrafts and a third point having a specific association with the aircraft symbols. This makes it possible for a traffic controller to visually grasp a relative relationship in a flight situation of each aircraft and gather the possibility of a near miss or collision between the aircrafts.

However, in the above-described prior art, although a traveling direction of each aircraft is displayed as a graduated vector extending in the traveling direction from each aircraft symbol, the traveling direction of each aircraft is not taken into account in determining whether or not to display the monitoring required mark (in other words, in determining to gather the near miss, etc. between aircrafts). Therefore, in the above-described prior art, there is a case where information such as the near miss between aircrafts is notified to a monitor more than necessary due to the display of the monitoring required mark.

Therefore, one or more embodiments of the present invention are to providing an information processing device and a display control method capable of notifying information urging caution to a monitor in a situation where it is determined that the possibility of a near miss or collision between the unmanned aerial vehicles is higher.

SUMMARY (An aspect 1) In response to the above issue, an information processing device includes: at least one memory configured to store program code; and at least one processor configured to access the program code and operate as instructed by the program code. The program code includes: first acquisition code configured to cause the at least one processor to acquire position information indicating a position of each of a plurality of unmanned aerial vehicles in flight; second acquisition code configured to cause the at least one processor to acquire direction information indicating a front direction of each of the plurality of unmanned aerial vehicles; and display control code configured to cause the at least one processor to cause an object representing each of the plurality of unmanned aerial vehicles to be displayed on a two-dimensional map screen on the basis of the position information. In a case where the plurality of unmanned aerial vehicles include two or more unmanned aerial vehicles in which a distance between the positions indicated by the respective position information is less than or equal to a predetermined first threshold value and the front directions indicated by the respective direction information are facing, the display control code is configured to cause the at least one processor to further cause information urging caution to be displayed in association with the object representing each of the two or more unmanned aerial vehicles on the two-dimensional map screen.

(An aspect 2) A display control method executed by one or more computers, includes: acquiring position information indicating a position of each of a plurality of unmanned aerial vehicles in flight; acquiring direction information indicating a front direction of each of the plurality of unmanned aerial vehicles; causing an object representing each of the plurality of unmanned aerial vehicles to be displayed on a two-dimensional map screen on the basis of the position information; and causing information urging caution to be displayed in association with the object representing each of the two or more unmanned aerial vehicles on the two-dimensional map screen, in a case where the plurality of unmanned aerial vehicles include two or more unmanned aerial vehicles in which the distance between the positions indicated by the respective position information is less than or equal to a predetermined first threshold value and the front directions indicated by the respective direction information are facing.

BRIEF DESCRIPTION OF THE DRAWINGS

FIG. 9 is a diagram illustrating a setting example of relationships between speed differences between the UAVs n and display modes of figures associated with respective UAV objects of the UAVs n.

FIG. 12 is a diagram illustrating an example display of an operation screen (a) when there is no the UAVs n and an operation screen (b) when there is the UAVs n.

DETAILED DESCRIPTION

Hereinafter, one or more embodiments of the present invention will be described with reference to the drawings. The following embodiment is an embodiment in a case where the present invention is applied to an UAV (Unmanned Aerial Vehicle) monitoring system for monitoring a flight status the UAV such as a drone or a multi-copter.

1. Configuration and Operation Outline of UAV Monitoring System S

Figure 1:
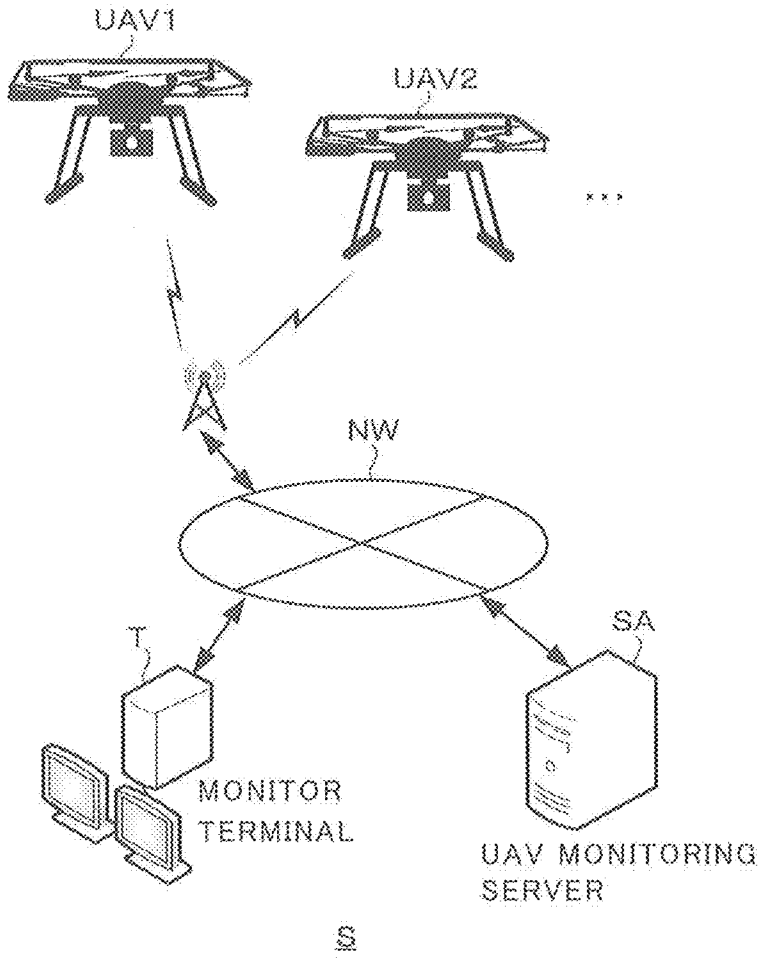
FIG. 1 is a diagram illustrating a schematic configuration example of an UAV monitoring system S.

First, a configuration and operation outline of an UAV monitoring system S according to the present embodiment will be described with reference to FIG. 1. FIG. 1 is a diagram illustrating a schematic configuration example of the UAV monitoring system S. As illustrated in FIG. 1, the UAV monitoring system S includes a plurality of UAVs n (n=1, 2, · · · ), an UAV monitoring server SA, a monitor terminal T, and the like. Here, the UAV monitoring server SA is an example of the information processing device (apparatus). The UAVs n, the UAV monitoring server SA, and the monitor terminal T are respectively connected to a communication network NW. The communication network NW includes, for example, the Internet, a mobile communication network and a radio base station thereof, and the like.

The UAV n is, for example, controlled to depart from a take-off and landing port for a predetermined purpose such as transporting (e.g., delivering) of an article, measuring, or the like, and to return to the take-off and landing port or another take-off and landing port. A base having the take-off and landing port used for taking off or landing of the UAV n is called an UAV base. The UAV base includes, for example, a site (or rooftop of a building) having an area at least as large as the area of the take-off and landing port. The UAV base may include a predetermined range above the site (or the rooftop of the building). The monitor terminal T is used by a monitor of the plurality of UAVs n in flight. The monitor may also, as an operator, give an operation instruction pertaining to flight control for the UAV n from the monitor terminal T. Operation instruction information indicating the operation instruction is transmitted to the UAV monitoring server SA via the communication network NW along with a vehicle ID of the UAV n.

1-1. Configuration and Function of UAV n

Figure 2:
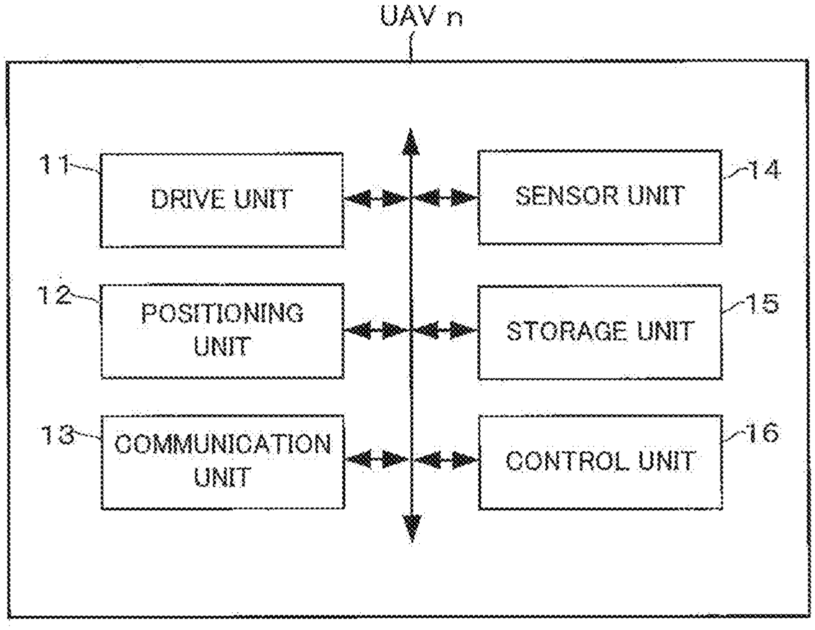
FIG. 2 is a diagram illustrating a schematic configuration example of an UAV n.

Next, a configuration and a function of the UAV n will be described with reference to FIG. 2. FIG. 2 is a diagram illustrating a schematic configuration example of the UAV n. As illustrated in FIG. 2, the UAV n includes a drive unit 11, a positioning unit 12, a communication unit 13, a sensor unit 14, a storage unit 15, a control unit 16, and the like. Moreover, although not shown, the UAV n includes a battery that supplies power to each unit of the UAV n, and a rotor (propeller) that is a plurality of horizontal rotary blades (wings). Incidentally, the UAV n may include a holding member or the like that holds the article to be loaded. Furthermore, the UAV n may be provided with a linear member such as a wire connected to the holding member, and a reel (winch) for feeding out or winding the linear member.

The drive unit 11 includes a motor, a rotation shaft, and the like. The drive unit 11 rotates a plurality of rotors by the motor, the rotation shaft, and the like that are driven in accordance with a control signal output from the control unit 16. The positioning unit 12 includes a radio wave receiver, an altitude sensor, and the like. The positioning unit 12 receives, for example, a radio wave transmitted from a GNSS (Global Navigation Satellite System) satellite by the radio wave receiver, and detects a current position (latitude and longitude) of the UAV n in a horizontal direction on the basis of the radio wave. Incidentally, the current position of the UAV n in the horizontal direction may be corrected on the basis of an image captured by a camera of the sensor unit 14. Position information indicating the current position detected by the positioning unit 12 is output to the control unit 16. Furthermore, the positioning unit 12 may detect a current position (altitude) of the UAV n in a vertical direction by the altitude sensor such as an atmospheric pressure sensor. In this case, the position information output to the control unit 16 indicates the horizontal position and the vertical position of the UAV n.

The communication unit 13 has a wireless communication function and controls communication performed via the communication network NW. The sensor unit 14 includes various sensors used for flight control and the like of the UAV n. The various sensors include, for example, an optical sensor, a speed sensor, a triaxial angular velocity sensor, a triaxial acceleration sensor, a geomagnetic sensor, and the like. The optical sensor is configured to include a camera (for example, an RGB camera, an infrared camera), and continuously captures images of real space that falls within an angle of view of the camera. Sensing information obtained by the sensing of the sensor unit 14 is output to the control unit 16. The storage unit 15 includes a nonvolatile memory or the like, and stores various programs and data. Moreover, the storage unit 15 stores a vehicle ID of UAV n. The vehicle ID is identification information for identifying each UAV n.

The control unit 16 includes at least one CPU (Central Processing Unit), a ROM (Read Only Memory), a RAM (Random Access Memory), and the like, and executes various types of control according to programs stored in the ROM or the storage unit 15. Various controls include flight control (including take-off control and landing control). In the flight control, the control unit 16 controls the rotation speed of the rotor, the position of UAV n, the attitude of UAV n, and traveling direction of UAV n by using the position information acquired from the positioning unit 12, the sensing information acquired from the sensor unit 14, flight path (flight route) information, and the like. This allows the control unit 16 to fly the UAV n autonomously.

Here, the flight path information is obtained, for example, from the UAV monitoring server SA. The flight path information includes, for example, location information indicating the positions of a plurality of waypoints on the flight path of the UAV n. The location of the waypoint is represented, for example, by a horizontal position (latitude and longitude). Alternatively, the location of the waypoint may be represented, for example, by a horizontal position (latitude and longitude) and a vertical position (altitude). Incidentally, in a case where the UAV n is used for delivery of the article, the flight path information includes position information of delivery destination of the article. Furthermore, the control unit 16 can also perform flight control of the UAV n in accordance with control information from the UAV monitoring server SA. The control information includes, for example, control information for causing the UAV n to make an emergency stop (e.g., hovering) on the spot, control information for causing the UAV n to return to the UAV base, control information for causing the UAV n to fly to the emergency landing site and land, or control information for causing the UAV n to land on the spot. Moreover, the control information may include, for example, control information for causing the UAV n to take off at the UAV base or control information for causing the UAV n to land at the UAV base.

Moreover, the control unit 16 acquires direction information indicating a front (front face) direction (i.e., traveling direction) of the UAV n, the position information indicating the position of the UAV n, and speed information indicating a speed (i.e., flight speed) of the UAV n. The direction information, the position information, and the speed information thus acquired are successively transmitted to the UAV monitoring server SA by communication unit 13, along with the vehicle ID of the UAV n. Here, the front direction of the UAV n is identified, for example, based on the sensing information from the triaxial acceleration sensor and the geomagnetic sensor included in the sensor unit 14. The front direction of UAV n means, for example, the direction (azimuth) that a front face of UAV n faces. The front face is not limited to a flat face, but may be a curved face. The front face of the UAV n is a face facing the traveling direction (i.e., a face that receives a headwind) of the UAV n, and is predetermined. The front direction of the UAV n is represented, for example, as eastward, westward, southward, northward, eastwestward, or southeastward in a two-dimensional plane.

Figure 3:
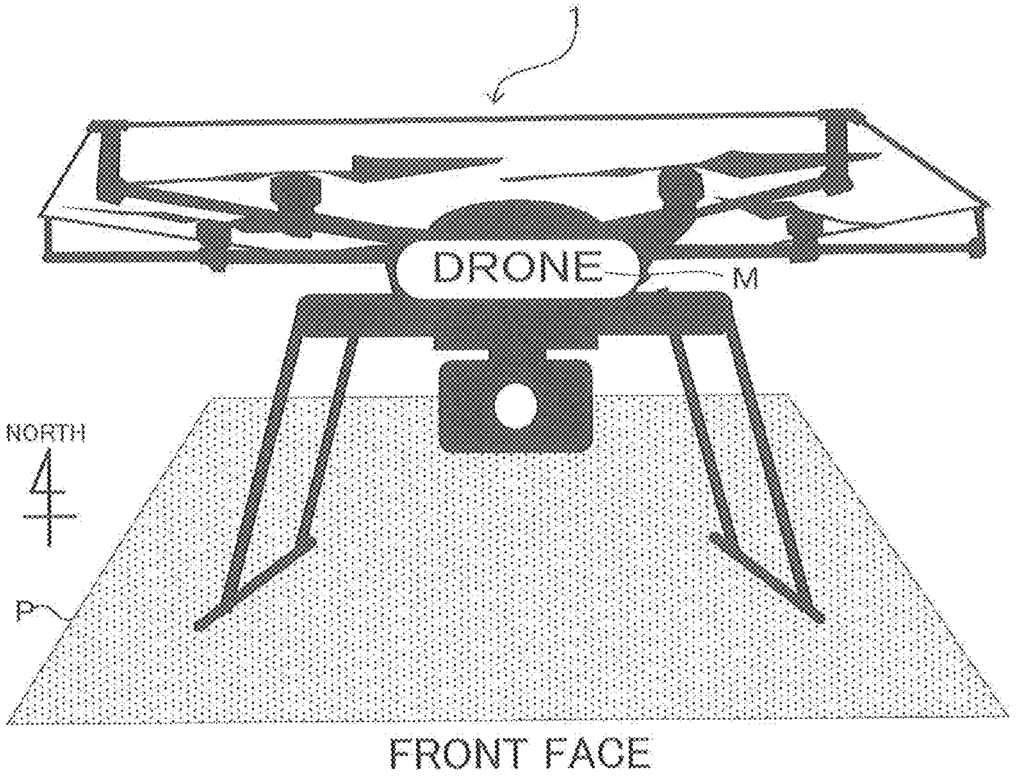
FIG. 3 is a diagram illustrating an exterior example of an UAV 1 in a state of landing at a port P.

Alternatively, the front direction of the UAV n may be represented by an angle with respect to north (i.e., an angle based on the north) in the two-dimensional plane. A mark such as a company logo, name, model number, or the like may be attached (in other words, marked) to the front face of the UAV n. FIG. 3 is a diagram illustrating an exterior (appearance) example of the UAV 1 in a state of landing at the port P. In the example of FIG. 3, the mark M is attached to the front of the UAV 1 to indicate that it is the front face, and the front of the UAV 1 faces south (that is, the front direction of the UAV 1 is the southward). Incidentally, the speed of the UAV n is identified, for example, based on the speed information from the speed sensor included in the sensor section 14.

1-2. Configuration and Function of UAV Monitoring Server SA

Figure 4:
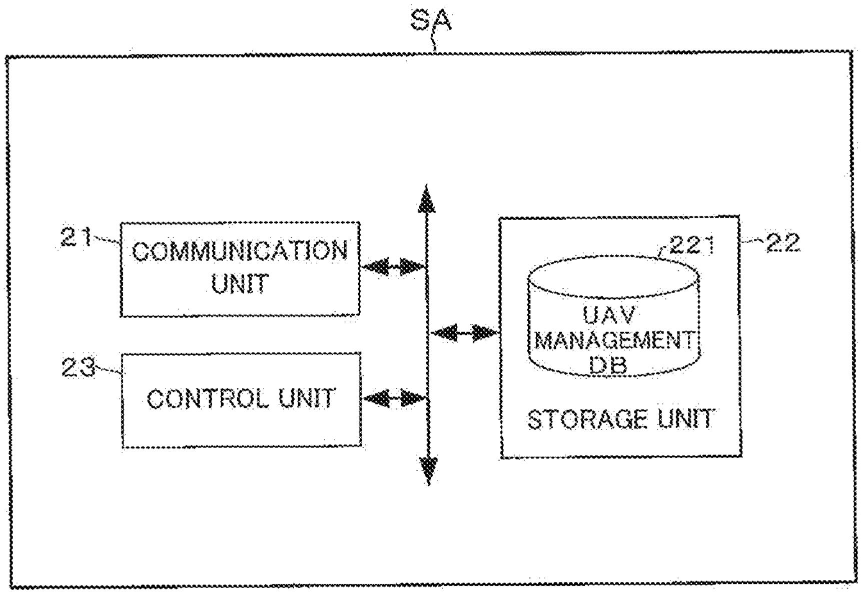
FIG. 4 is a diagram illustrating a schematic configuration example of the UAV monitoring server SA.

Next, a configuration and a function of the UAV monitoring server SA will be described with reference to FIG. 4. FIG. 4 is a diagram illustrating a schematic configuration example of the UAV monitoring server SA. As illustrated in FIG. 4, the UAV monitoring server SA includes a communication unit 21, a storage unit 22, a control unit 23, and the like. The communication unit 21 controls communication performed via the communication network NW. The position information, the direction information, the speed information, and the like that are transmitted from the UAV n are received by the communication unit 21. Moreover, the operation instruction information and the like that are transmitted from the monitor terminal T are received by the communication unit 21. The storage unit 22 includes, for example, a hard disk drive (HDD) or a solid state drive (SSD), and stores various programs including an operating system (OS).

The storage unit 22 stores data constituting a two-dimensional map screen in which two-dimensional map image data is incorporated. The data constituting the two-dimensional map screen is provided to the monitor terminal T. As a result, the two-dimensional map screen is displayed on a display of the monitor terminal T. Moreover, the storage unit 22 stores data of elements (for example, objects, figures, etc. to be described later) to be displayed on the two-dimensional map screen. Moreover, the storage unit 22 stores data constituting an operation screen for receiving an operation instruction pertaining to flight control for the UAV n from the monitor. The data constituting the operation screen is provided to the monitor terminal T. As a result, the operation screen is displayed on the display of the monitor terminal T. Incidentally, the storage unit 22 includes a buffer memory that stores the position information, the direction information, and the speed information that are received from the UAV n in association with the vehicle ID of the UAV n for each UAV n. In the buffer memory, the position information, the direction information, and the speed information are updated successively.

Furthermore, an UAV management database (DB) 221 and the like are constructed in the storage unit 22. The UAV management database 221 is a database for managing information on the UAV n to be monitored. In the UAV management database 221, for example, the vehicle ID, the flight path information, the operating status information of the UAV n to be monitored, and the like are stored in association with each UAV n. Here, the operating status information indicates an operating status (in other words, working situation) of the UAV n. The operating status indicates, for example, "flying", "standing by", or the like. The operating status is updated as appropriate. The "standing by" indicates a situation where the UAV n is in flight standby. For example, the "standing by" indicates a situation where the UAV n has completed flight preparations at the UAV base and is waiting to fly. The "flying" indicates a situation where the UAV n is in flight. The "flying" may include a situation where UAV n is hovering.

The control unit 23 includes at least one CPU, a ROM, a RAM, and the like, and performs various processes according to the programs (program code) stored in the storage unit 22 or the ROM, or non-transitory computer readable memory. The CPU (an example of processor) is configured to access the program code stored in the storage unit 22 or the memory and operate as instructed by the program code. The program code includes: first acquisition code configured to cause the CPU to acquire position information indicating a position of each of a plurality of the UAVs n in flight; second acquisition code configured to cause the CPU to acquire direction information indicating a front direction of each of the plurality of the UAVs n; and display control code configured to cause the CPU to cause an object representing each of the plurality of the UAVs n to be displayed on the two-dimensional map screen on the basis of the position information. Then, in a case where the plurality of the UAVs n include two or more the UAVs n in which a distance between the positions indicated by the respective position information is less than or equal to a predetermined first threshold value and the front directions indicated by the respective direction information are facing, the display control code is configured to cause the CPU to further cause information urging caution to be displayed in association with the object representing each of the two or more UAVs n on the two-dimensional map screen. The program code may further include third acquisition code configured to cause the CPU to acquire speed information indicating a speed of each of the two or more UAVs n. Then, the display control code may be configured to cause the CPU to further cause the speed information of each of the two or more UAVs n and the information urging caution to be displayed in association with the object representing each of the two or more UAVs n on the two-dimensional map screen. Incidentally, the processor may be implemented using circuitry or processing circuitry which includes general purpose processors, special purpose processors, integrated circuits, ASICs, conventional circuitry and/or combinations thereof which are configured or programmed to perform the disclosed functionality. The processor may be hardware (or a combination of hardware and software) that carry out or are programmed to perform the recited functionality.

The program code may further include calculation code configured to cause the CPU to calculate a difference in speed between the two or more UAVs n on the basis of the speed information. Then, in a case where the difference in speed is equal to or greater than a predetermined second threshold value, the display control code may be configured to cause the CPU to further cause the speed information to be displayed in a display mode representing that there is a speed difference between the two or more UAVs n. On the other hand, in a case where the difference in speed is less than the second threshold value, the display control code may be configured to cause the CPU to further cause the speed information to be displayed in a display mode representing that there is not a speed difference between the two or more UAVs n. The program code may further include calculation code configured to cause the CPU to calculate a difference in speed between the two or more UAVs n on the basis of the speed information. Then, in a case where the difference in speed is equal to or greater than a predetermined second threshold value, the display control code is configured to cause the CPU to further control display sizes of the figures such that the display size of the figure associated with the object representing the UAV n with a relatively higher speed is larger than the figure associated with the object representing the UAV n with a relatively lower speed among the two or more UAV n. On the other hand, in a case where the difference in speed is less than the second threshold value, the display control code may be configured to cause the CPU to further control display sizes of the figures such that the display size of the figures associated with the object representing each of the two or more UAVs n is the same size. The program code may further include third acquisition code configured to cause the CPU to acquire speed information indicating a speed of each of the two or more UAVs n. Then, the display control code may be configured to cause the CPU to further cause an operation screen to be displayed, the operation screen being for receiving an operation instruction pertaining to a flight control for the two or more UAVs n from an operator, and cause the CPU to restrict a reception of the operation instruction pertaining to the flight control for the UAV n with a relatively higher speed among the two or more UAVs n.

Figure 5:
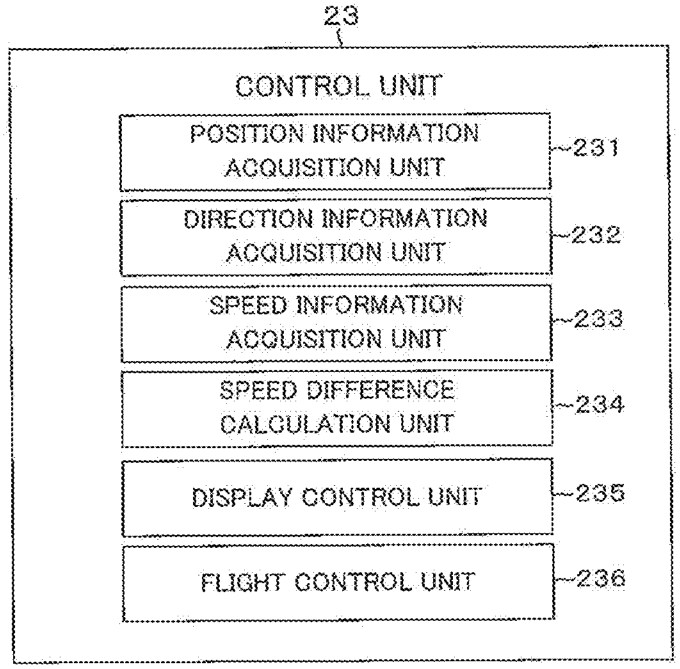
FIG. 5 is a diagram illustrating an example of functional blocks in a control unit 23.

FIG. 5 is a diagram illustrating an example of functional blocks in the control unit 23. For example, in accordance with the program (the program code), the control unit 23 functions as a position information acquisition unit 231, a direction information acquisition unit 232, a speed information acquisition unit 233, a speed difference calculation unit 234, a display control unit 235, a flight control unit 236, and the like, as illustrated in FIG. 5.

The position information acquisition unit 231 acquires, from the respective UAVs n via the communication unit 21, position information indicating the position of each of the plurality of UAVs n in flight among the plurality of UAV s n to be monitored. For example, the position information acquisition unit 231 acquires the respective position information from the buffer memory in the storage unit 22. The position information indicates at least the horizontal position (latitude and longitude) of the UAV n. The horizontal position is a position in the horizontal direction. Alternatively, the position information may indicate the vertical position (altitude) in addition to the horizontal position of the UAV n. The vertical position is a position in the vertical direction.

The direction information acquisition unit 232 acquires, from the respective UAVs n via the communication unit 21, direction information indicating the front direction of each of the plurality of UAV s n in flight among the plurality of UAVs n to be monitored. For example, the direction information acquisition unit 232 acquires the respective direction information from the buffer memory in the storage unit 22. Incidentally, the direction information acquisition unit 232 may calculate the traveling direction of the UAV n from two different positions of the UAV n. In this case, the direction information acquisition unit 232 acquires the direction information indicating the calculated traveling direction.

The speed information acquisition unit 233 acquires, from the respective UAVs n via the communication unit 21, speed information indicating the speed of each of the plurality of UAVs n in flight among the plurality of UAVs n to be monitored. For example, the speed information acquisition unit 233 acquires the respective speed information from the buffer memory in the storage unit 22. Incidentally, the speed information acquisition unit 233 may calculate the speed of the UAV n on the basis of the amount of change in the position of the UAV n per unit time. In this case, the speed information acquisition unit 233 acquires speed information indicating the calculated speed.

The display control unit 235 causes, based on the position information (position information of the UAV n) acquired by the position information acquisition unit 231, the object (also referred to as an icon, hereinafter referred to as the "UAV object") representing each of the plurality of UAVs n to be displayed on the two-dimensional map screen of the monitor terminal T. Here, "causing, causes, based on the position information, the UAV object representing each of the plurality of UAVs n to be displayed on the two-dimensional map screen" means controlling to display the UAV object at a coordinate position corresponding to the position (latitude and longitude) indicated by the position information of the UAV n. The coordinate position is a coordinate position (x, y) on the two-dimensional map screen. For example, the coordinate position is a coordinate position with a center of the upper left corner pixel of the two-dimensional map screen as the origin (x0, y0). The UAV object whose coordinate position corresponding to the position information of the UAV n falls within the two-dimensional map screen is displayed. Incidentally, the UAV object is represented by a pattern (picture), a figure, a photograph or the like.

Figure 6:
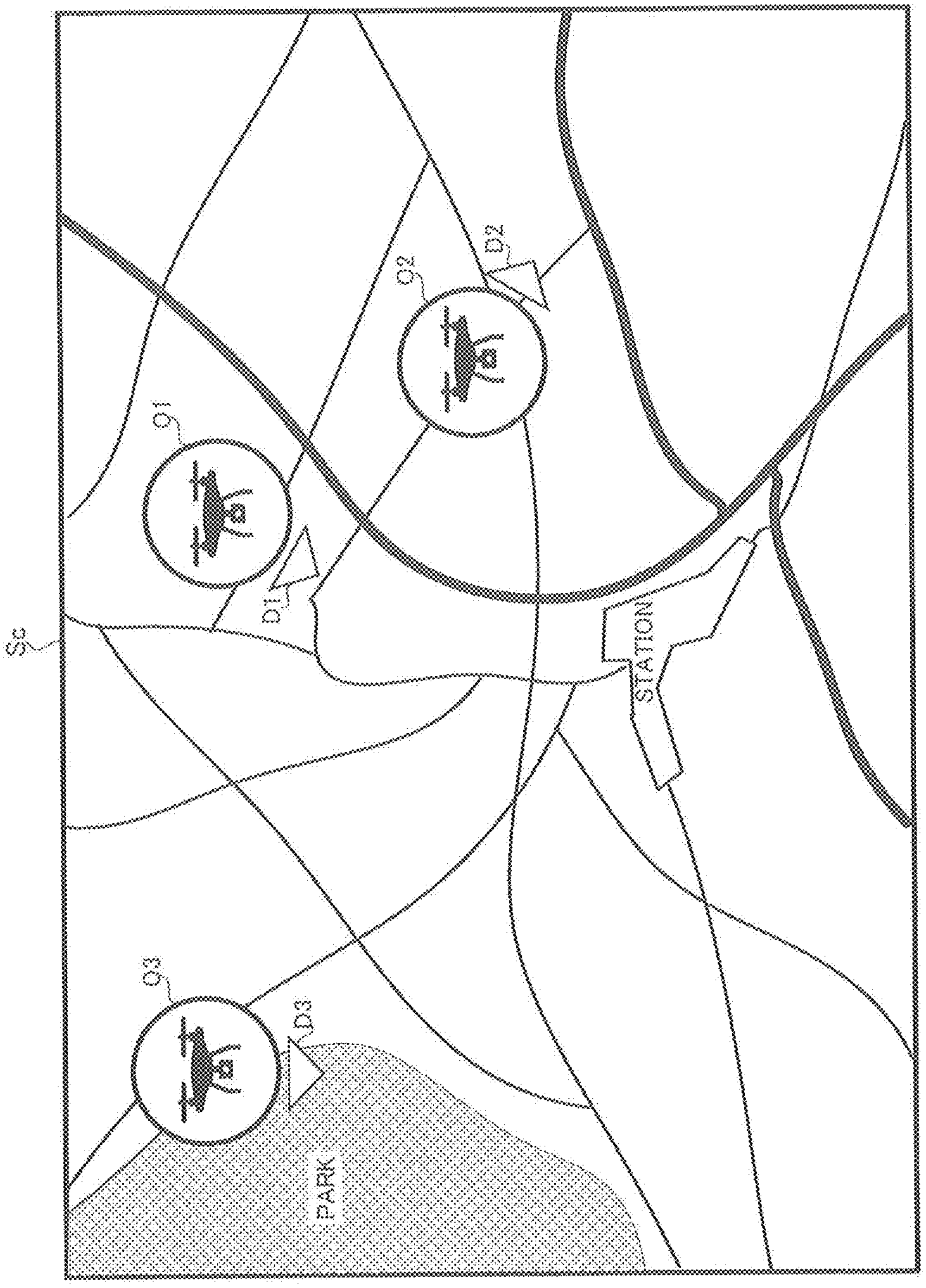
FIG. 6 is a diagram illustrating a display example of a two-dimensional map screen on which UAV objects of the respective UAVs n and figures representing the front direction of the respective UAVs n are arranged.

Moreover, the display control unit 235, based on the direction information (i.e., direction information of the respective UAVs n) acquired by the direction information acquisition unit 232, may cause the figures representing the front directions of the respective UAVs n to be displayed in association with the respective UAV objects on the two-dimensional map screen. FIG. 6 is a diagram illustrating a display example of a two-dimensional map screen on which the UAV objects of the respective UAVs n (UAV 1 to UAV 3) and the figures representing the front direction of the respective UAVs n are arranged. In the example of FIG. 6, the figures D1 to D3 representing the front direction are displayed in association with (added to) each of the UAV objects O1 to O3 on the two-dimensional map screen Sc. The figures D1 to D3 shown in FIG. 6 are an isosceles triangle, and the direction pointed by the apex (obtuse angle) of the triangle is the front direction. Incidentally, the figure D2 is not limited to the triangle, but may be any figure (for example, an arrow figure) as long as a figure can point in a direction.

Then, the display control unit 235 determines, in the plurality of UAVs n to be monitored, whether there are two or more UAVs n in which a distance between the positions (e.g., horizontal positions) indicated by the respective position information is less than or equal to a predetermined first threshold value (e.g., several tens of meters) and the front directions indicated by the respective direction information are facing (in other words, opposite) each other. Then, in a case where it is determined that there are such two or more UAVs n (i.e., such two or more UAVs n are included in the plurality of UAVs n to be monitored), the display control unit 235 causes information urging caution to be displayed in association with the respective UAV objects of the two or more UAVs n on the two-dimensional map screen. By the way, “the front directions are facing” is not necessarily limited to a state in which the UAVs n are completely facing each other. For example, when the two or more UAVs n are in a state such that virtual lines extending from the positions indicated by the respective position information toward the front directions indicated by the respective direction information intersect within a predetermined range, it is determined that those two or more UAVs n are facing each other. This makes it possible to quickly determine whether or not the respective UAVs n are facing each other on the basis of the front directions of the respective UAVs n in which the current positions are set in a specific coordinate system without predicting the positions of the UAVs n in the future after a certain time.

Incidentally, in order to determine whether or not the front directions of the two or more UAVs n are facing each other, the processing of drawing the virtual lines may be executed in the coordinate system in which the current positions of the UAVs n are set, but even if such processing is not performed, it may be determined whether or not the virtual lines are in a state in which the virtual lines intersect within the predetermined range from the directions of the UAVs n in which the current positions are set in the coordinate system. The “a state in which the virtual lines intersect” may include not only a completely intersecting state, but also a state close to intersecting. In this case, what kind of state corresponds to the state that is close to intersecting is set in advance. In the following description, the two or more UAVs n that satisfy the condition that the distance between each other's positions is less than or equal to the predetermined first threshold value and that the front directions are facing each other are referred to as “attention target UAVs n” (i.e., UAVs n to be cautioned).

Figure 7:
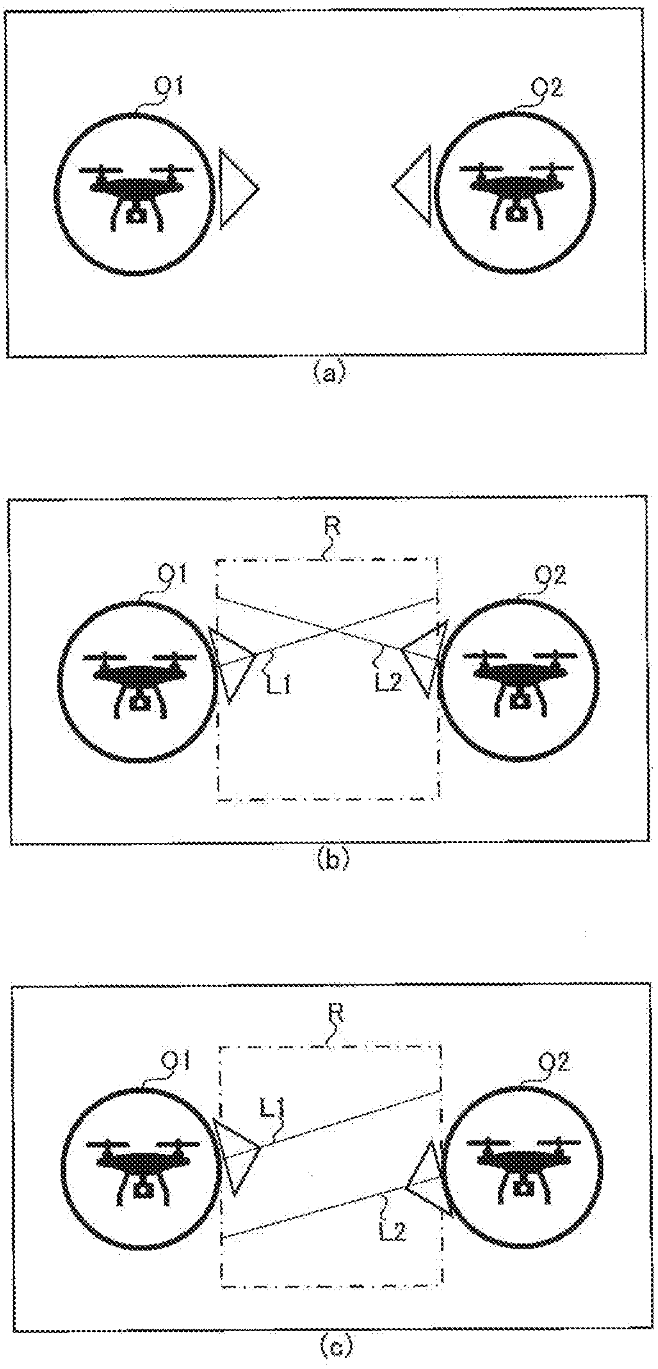
FIG. 7 is a diagram illustrating a display example of a two-dimensional map screen on which UAV objects of the respective UAVs n and the figures representing the front direction of the respective UAVs n are arranged.

FIG. 7 is a conceptual diagram illustrating examples of the state (a), (b) in which the front directions of two UAVs n are determined to be facing each other and the state (c) in which the front directions of two UAVs n are determined not to be facing each other, as represented by UAV objects. Specifically, the state (a) is the state in which the UAV 1 and the UAV 2 are completely facing each other. That is, the state (a) is the state in which the front direction of the UAV 2 is 180 degrees, assuming that the front direction of the UAV 1 is 0 degrees. The state (b) is the state in which the virtual lines L1 and L2 extending toward the respective front directions of the UAV 1 and the UAV 2 intersect in the predetermined range R. The state (c) is the state in which the virtual lines L1 and L2 extending toward the respective front directions of the UAV 1 and the UAV 2 do not intersect in the predetermined range R. Incidentally, the predetermined range R is set to the rectangular shape in the area between the UAV 1 and the UAV 2, but may be set to a different shape (e.g., circular shape), or a different size.

Figure 8:
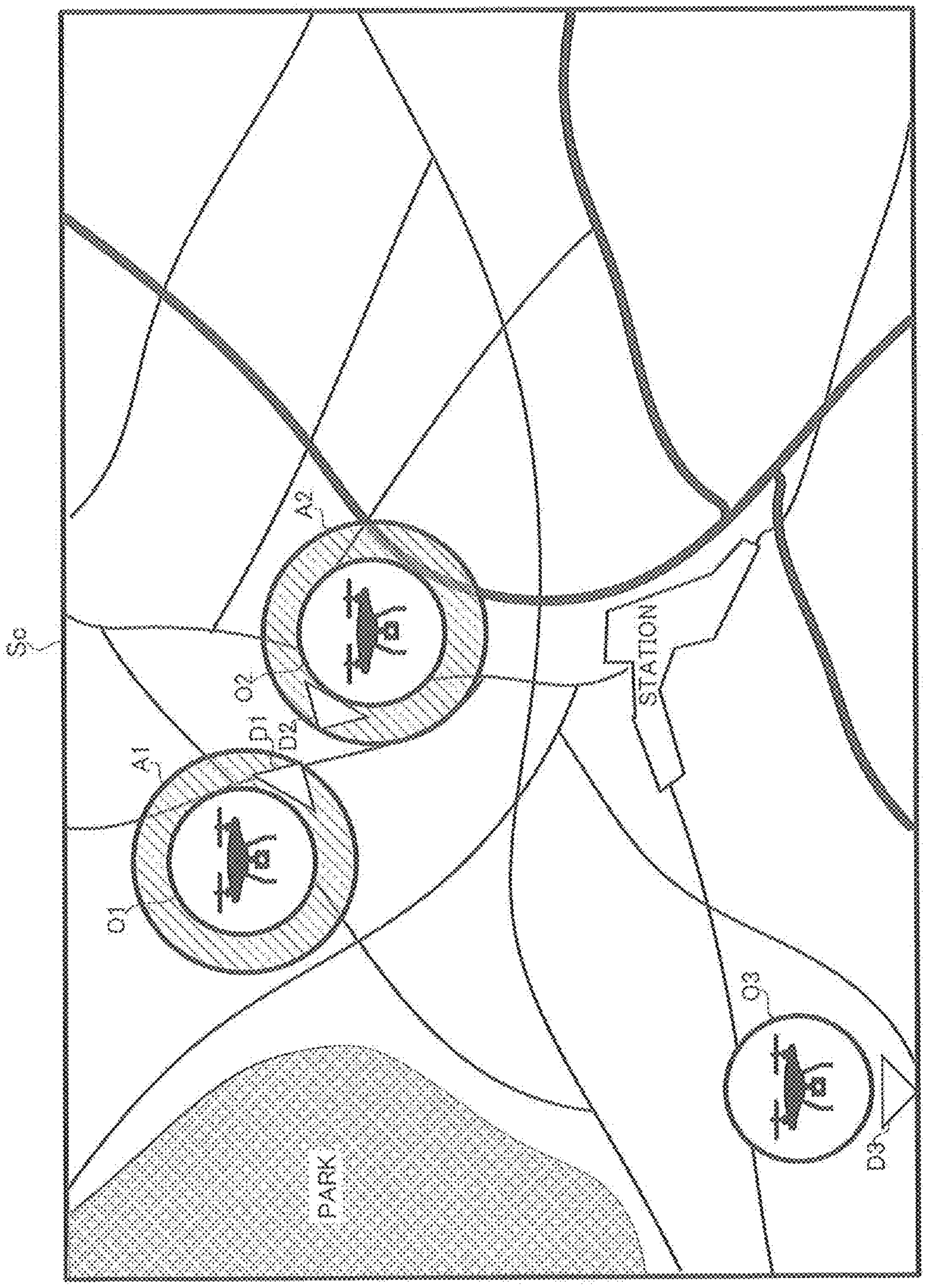
FIG. 8 is a diagram illustrating a display example of a two-dimensional map screen in which UAV objects of the UAVs n, figures representing the front directions of the UAVs n, and information urging caution are arranged.

FIG. 8 is a diagram illustrating a display example of the two-dimensional map screen in which the UAV objects of the attention target UAVs n (UAV 1 and UAV 2), the figures representing the front directions of the UAVs n, and the information urging caution are arranged. In the example of FIG. 8, the circular figures A1, A2 (an example of information urging caution) are displayed in association with the respective UAV objects O1, O2 (e.g., they are appended to surround the UAV objects O1, O2) on the two-dimensional map screen Sc. Here, the display color of the circular shapes A1 and A2 may be different from the display color of the UAV objects O1, O2, so that the circular shapes A1, A2 may be prominently displayed. Incidentally, in the example of FIG. 8, it can be seen that the UAV 1 and the UAV 2 are completely facing each other from the front directions represented by the respective figures D1, D2 associated with each of the UAV objects O1, O2.

Moreover, the display control unit 235 may cause, based on the speed information (speed information of the UAV n) acquired by the speed information acquisition unit 233, the respective speed information of the UAVs n to be displayed in association with the respective UAV objects on the two-dimensional map screen. In particular, it is preferable that the display control unit 235 causes the speed information of each of the attention target UAVs n and the information urging caution be displayed in association with the respective UAV objects of the attention target UAVs n on the two-dimensional map screen. This makes it possible to visually inform the monitor of the degree of probability (e.g., urgency, emergency or imminentness) of near miss or potential collision between the attention target UAVs n. Incidentally, the speed information may be displayed as a numerical value representing the speed of the UAV n. Alternatively, the speed information may be displayed as a figure representing the speed with a display color or a display size.

Moreover, in a case where the difference in the respective speeds of the attention target UAVs n is equal to or greater than a predetermined second threshold value, the display control unit 235 may cause the speed information to be displayed in a display mode (in other words, display style) representing that there is a speed difference between the attention target UAVs n. On the other hand, in a case where the difference in the respective speeds of the attention target UAVs n is less than the second threshold value, the display control unit 235 may cause the speed information to be displayed in a display mode representing that there is not a speed difference between the attention target UAVs n. This makes it possible to visually and intelligibly inform the monitor of the degree of probability of near miss or potential collision between the attention target UAVs n, and to reduce a CPU processing load caused by the display mode changing more than necessary. Incidentally, the difference in the respective speeds of the attention target UAVs n is calculated by the speed difference calculation unit 234 based on the speed information acquired by the speed information acquisition unit 233. Examples of the display mode include a display size and a display color.

For example, in a case where the difference in the respective speeds of the attention target UAVs n is equal to or greater than the predetermined second threshold, the display control unit 235 controls display sizes of the figures such that the display size of the figure associated with the UAV object of the UAV n with a relatively higher speed is larger than the figure associated with the UAV object of the UAV n with a relatively lower speed among the attention target UAVs n. On the other hand, in a case where the difference in the respective speeds of the attention target UAVs n is less than the second threshold value, the display control unit 235 controls display sizes of the figures such that the display size of the figures associated with the UAV objects of the respective UAVs n is the same size. Here, the second threshold value may be set in a plurality of levels. In this case, the display control unit 235 controls display sizes of the figures such that the difference in the display sizes of the figures associated with the UAV objects of the attention target UAVs n increases as the difference in the respective speeds of the attention target UAVs n increases. This makes it possible to visually and more intelligibly inform the monitor of the degree of probability of near miss or potential collision between the attention target UAVs n, and to reduce a CPU processing load caused by the display mode changing more than necessary.

FIG. 9 is a diagram illustrating a setting example of relationships between speed differences between the attention target UAVs n and display modes of figures associated with respective UAV objects of the attention target UAVs n. In the example of FIG. 9, the speed differences between the attention target UAVs n are set to three levels of "small", "medium", and "large", but may be two levels, or four levels or more. In this example, "1 m/s" and "2 m/s" are set as the second threshold values. Then, the display sizes are set such that the difference in the display sizes of the figures associated with the UAV objects of the UAVs n increases as the difference in the respective speeds of the UAVs n increases. In the example of FIG. 9, for example, "FIGURE WITH FASTER SPEED" means the figure of the UAV n with faster speed. Moreover, in the example of FIG. 9, the speed of the faster UAV n among the attention target UAVs n, is set to three levels of "high speed", "medium speed", and "low speed", but may be two levels, or four levels or more. Then, the display color is set such that the display color of the figure associated with the UAV object becomes a color (e.g., red) with higher visibility as the speed of the UAV n increases.

Figure 10:
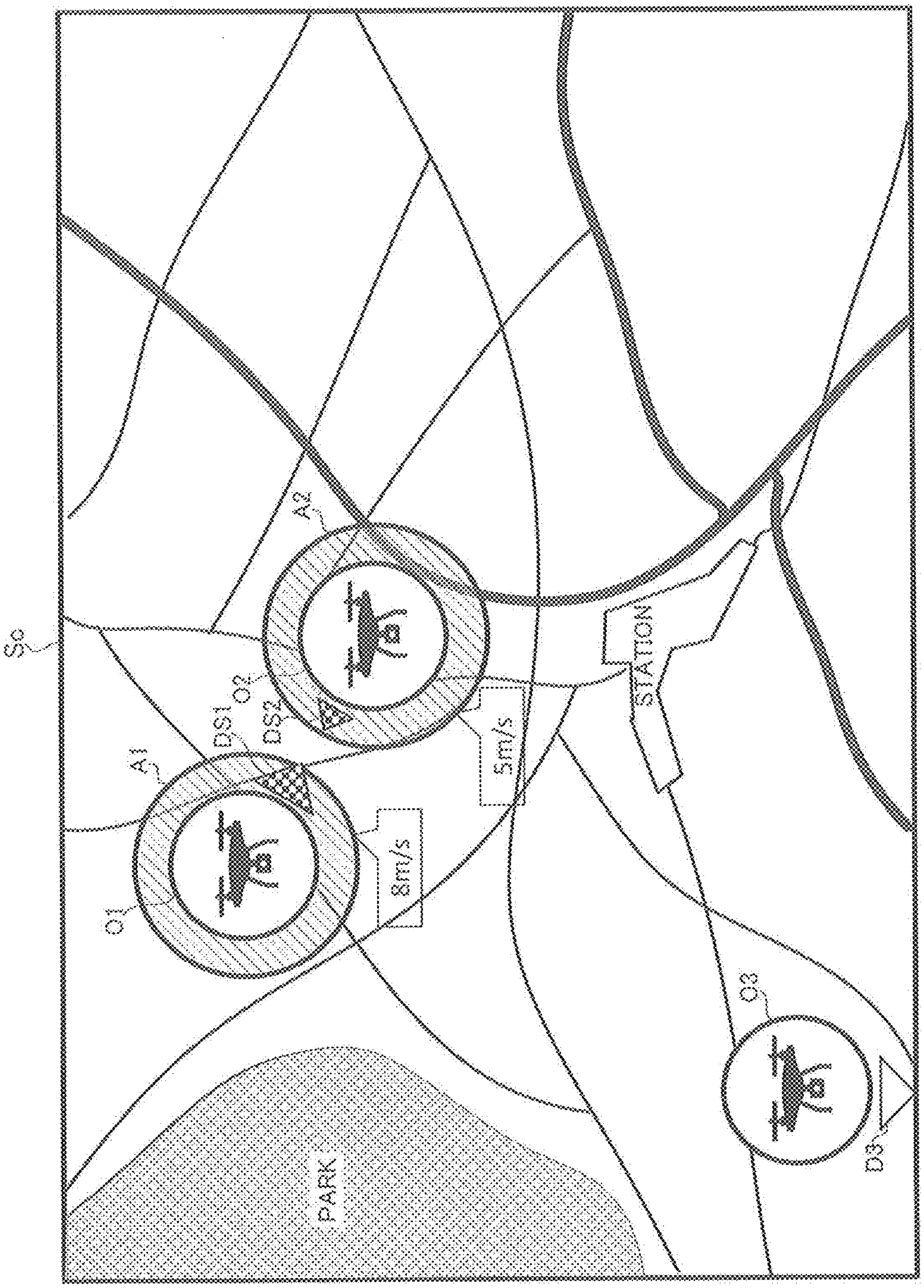
FIG. 10 is a diagram illustrating a display example of a two-dimensional map screen on which UAV objects of the UAVs n, numerical values indicating the respective speeds of the UAVs n, figures representing the respective front directions and the respective speeds of the UAVs n, and information urging attention are arranged.

FIG. 10 is a diagram illustrating a display example of the two-dimensional map screen on which UAV objects of the attention target UAVs n (UAV 1 and UAV 2), numerical values indicating the respective speeds of the attention target UAVs n, figures representing the respective front directions and the respective speeds of the attention target UAVs n, and information urging attention are arranged. In the example of FIG. 10, the numerical values "8 m/s" and "5 m/s" indicating of the speeds, the figures DS1, DS2 representing the front directions and the speeds, and the circular figures A1, A2 (an example of information urging attention) in association with each of the UAV objects O1, O2 on the two-dimensional map screen Sc. Moreover, in the example of FIG. 10, the display size of the figure DS1 associated with the UAV object O1 is displayed larger than the display size of the figure DS2 associated with the UAV object O2 because the speed of the UAV 1 is faster than the speed of the UAV 2, and these speed differences are equal to or greater than a threshold value.

Moreover, in a case where the position information acquired by the position information acquisition unit 231 indicates the horizontal position and the vertical position of each of the plurality of UAVs n, the display control unit 235 may determine, in the plurality of UAVs n (the attention target UAVs n) to be monitored, whether there are two or more UAVs n in which a distance between the horizontal positions indicated by the respective position information is less than or equal to the predetermined first threshold value, a distance between the vertical positions indicated by the respective position information is less than or equal to a predetermined third threshold value (e.g., several tens of meters), and the front directions indicated by the respective direction information are facing each other. Then, in a case where it is determined that there are such two or more UAVs n (i.e., such two or more UAVs n are included in the plurality of UAVs n to be monitored), the display control unit 235 may cause information urging caution to be displayed in association with the respective UAV objects of the attention target UAVs n on the two-dimensional map screen. This makes it possible to effectively notify the monitor of the information urging caution in a situation where it is determined that the possibility of a near miss or collision potential collision between the attention target UAVs n is even higher.

Figure 11:
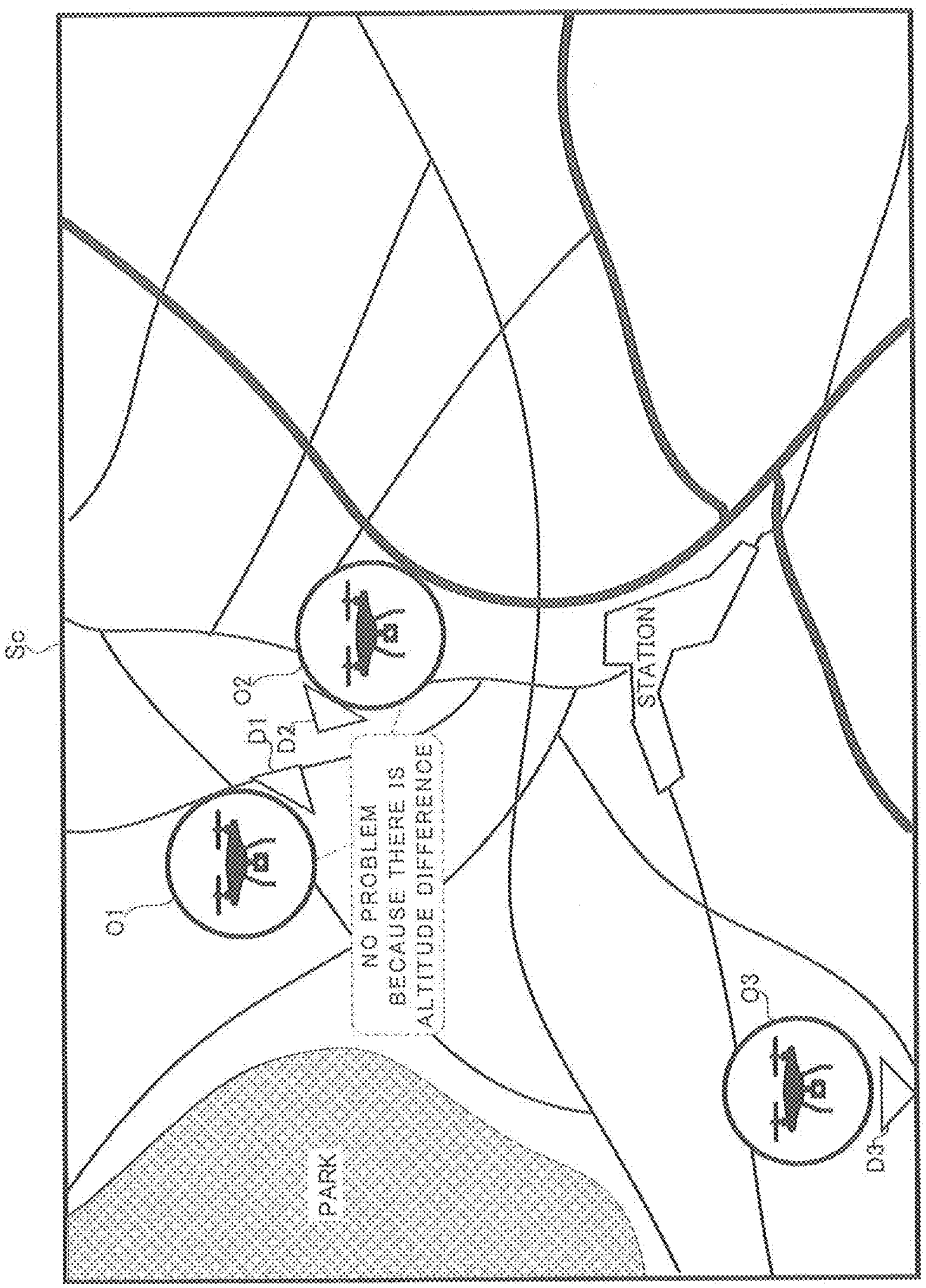
FIG. 11 is a diagram illustrating a display example of a two-dimensional map screen on which UAV objects of the UAVs n that is not subject to attention, figures representing the respective front directions of the UAVs n, and attention-free information are arranged.

On the other hand, in a case where it is determined that the distance between the vertical positions of two or more UAVs n in which the distance between the horizontal positions is less than or equal to the first threshold value and the front directions are facing each other, is greater than the third threshold value, it is preferable that the display control unit 235 may cause information indicating that the caution (attention) is not required (hereinafter referred to as a "attention-free information")to be displayed on the two-dimensional map screen. That is, even if the distance between the horizontal positions of the UAVs n facing each other in the front directions is short, if the distance between the vertical positions of the UAVs n is long (i.e., the altitude difference is greater than a threshold), the attention-free information is displayed because the possibility of a near miss or collision between the UAVs n is low. FIG. 11 is a diagram illustrating a display example of a two-dimensional map screen on which UAV objects of UAVs n (UAV 1 and UAV 2) that is not subject to attention, figures representing the respective front directions of the UAVs n, and the attention-free information are arranged. In the example of FIG. 11, the message "NO PROBLEM BECAUSE THERE IS ALTITUDE DIFFERENCE" is displayed as the attention-free information on the two-dimensional map screen Sc in association with the UAV objects O1, O2 of the UAV 1 and UAV 2 that were not subject to attention. Thus, even if the two or more UAVs n in which the distance between the horizontal positions is less than or equal to the first threshold value and the front directions are facing each other, are visible by the monitor on the two-dimensional map screen, it is possible to effectively inform the monitor of that the possibility of a near miss or collision between the UAVs n is low.

Incidentally, the display control of the UAV objects to be monitored is performed by transmitting display control data for displaying the UAV objects and the figures to the monitor terminal T through the communication unit 21 by the display control unit 235. The display control data includes, for example, data indicating the UAV objects, data indicating the coordinate positions of the UAV objects, data indicating the figures (for example, figures representing the front directions of the UAVs n), and the like. Here, the data indicating the UAV objects is, for example, image data of the UAV objects, and the data indicating the figures is image data of the figures. Moreover, the display control of the information indicating that attention is not required is performed by transmitting display control data for displaying the attention-free information (i.e., display control data that includes the attention-free information) to the monitor terminal T through the communication unit 21 by the display control unit 235.

Moreover, the display control of the UAV objects of the attention target UAVs n is performed by transmitting display control data for displaying the information urging attention (e.g., image data of a circular shape surrounding the UAV object), data indicating the UAV objects, etc.), and the like to the monitor terminal T through the communication unit 21 by the display control unit 235. In the display control data of this case, the data indicating the figures of the attention target UAVs n may further indicate figures of the display mode (e.g., the display color) according to the respective speeds of the UAVs n and the display mode (e.g., the display size) according to the speed difference between the UAVs n. Incidentally, when the image data of the UAV objects and the figures is managed by a monitor application installed in the monitor terminal T, identifiers corresponding to the image data of the respective UAV objects may be included in the display control data instead of the image data.

Moreover, the display control unit 235 may restrict (e.g., prohibit) a reception of an operation instruction pertaining to the flight control for the UAV n with a relatively higher speed among the attention target UAVs n on the operation screen displayed on the monitor terminal T. This makes it possible to effectively implement the flight control for only the UAV n with a relatively slower speed among the attention target UAVs n. Namely, this allows efficient implementation of the flight control for UAV n, for which flight control is easily effective. Incidentally, the restriction of the reception of the operation instruction is made by, for example, receiving restriction data for restricting the reception of the operation instruction being transmitted to the monitor terminal T through the communication unit 21.

FIG. 12 is a diagram illustrating an example display of an operation screen (a) when there is no the attention target UAVs n and an operation screen (b) when there is the attention target UAVs n. The operation screens (a), (b) shown in FIG. 12 include the operation icon display section 51 with operation icons 51*a*-51*d* for UAV 1 and the operation icon display section 52 with operation icons 52*a*-52*d* for UAV 2. In the operation screen (a) shown in FIG. 12, the operation icons 51*a* to 51*d* for the UAV 1 and the operation icons 52*a* to 52*d* for the UAV 2 are capable of receiving (accepting) the operation instructions from the monitor. On the other hand, in the operation screen (b) shown in FIG. 12, the operation icons 52*a* to 52*d* for the UAV 2 with slower speed are capable of receiving the operation instructions from the monitor, but the operation icons 51*a* to 51*d* for the UAV 1 with faster speed are grayed out such that the operation instructions from the monitor cannot be received.

Incidentally, the operation icons 51*a*, 52*a* are operation buttons for receiving operation instructions for causing the UAVs n to make an emergency stop on the spot immediately. Moreover, the operation icons 51*b*, 52*b* are operation buttons for receiving operation instructions for causing the UAVs n to return to the UAV base. Moreover, the operation icons 51*c*, 52*c* are operation buttons for receiving operation instructions for causing the UAVs n to fly to an emergency landing point and land. Moreover, the operation icons 51*d*, 52*d* are operation buttons for receiving operation instructions for causing the UAVs n to land on the spot immediately.

In a case where an operation instruction pertaining to the flight control of the UAV n is received through the operation screen displayed on the monitor terminal T (that is, when the operation instruction information indicating the operation instruction is received through the communication unit 21), the flight control unit 236 transmits control information according to the operation instruction to the UAV n subject to the operation instruction. The control information includes, as described above, control information for causing the UAV n to make the emergency stop on the spot (e.g., hovering), control information for causing the UAV n to return to the UAV base, control information for causing the UAV n to fly to the emergency landing point and land, or control information for causing the UAV n to land on the spot (e.g., without moving horizontally).

1-3. Configuration and Function of Monitor Terminal T

Figure 13:
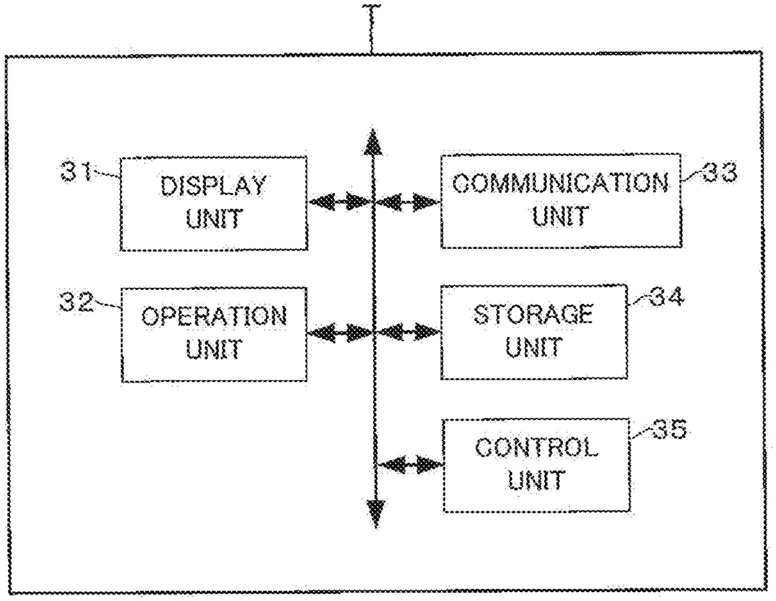
FIG. 13 is a diagram illustrating a schematic configuration example of a monitor terminal T.

Next, a configuration and a function of the monitor terminal T will be described with reference to FIG. 13. FIG. 13 is a diagram illustrating a schematic configuration example of the monitor terminal T. As illustrated in FIG. 13, the monitor terminal T includes a display unit 31, an operation unit 32, a communication unit 33, a storage unit 34, a control unit 35, and the like. The display section 31 includes the display for displaying the two-dimensional map screen and the operation screen, etc. The display may be physically divided into a display for the two-dimensional map screen and a display for the operation screen. Moreover, the display may be a touch panel capable of receiving an operation instruction by a user's finger, pen, or the like. The operation unit 32 includes a keyboard and a mouse operated by the monitor. The communication unit 33 includes a wireless communication function and controls communication performed via the communication network NW.

The storage unit 34 includes, for example, a hard disk drive (HDD) or a solid state drive (SSD), and stores various installed programs and data. The various programs include an operating system (OS), applications, and a web browser. The applications include a monitor application for monitoring UAVs n and a control application for controlling UAVs n. The monitor application may incorporate and manage the data constituting the two-dimensional map screen, image data of the UAV objects, and the like. Moreover, the control application may incorporate and manage the data constituting the operation screen.

The control unit 35 includes at least one CPU, an ROM, an RAM, and the like. The control unit 35 causes the two-dimensional map screen to be displayed on the display in accordance with the monitor application. The data constituting the two-dimensional map screen may be received from the UAV monitoring server SA as appropriate. The display range of the two-dimensional map image in the two-dimensional map screen is changed in response to an instruction from the operation unit 32. Then, the information indicating the display range of the two-dimensional map image may then be transmitted to the UAV monitoring server SA. Incidentally, the control unit 35 may receive a web page from the UAV monitoring server SA when an URL (Uniform Resource Locator) of the web page containing data constituting the two-dimensional map screen is specified by the web browser, and cause the two-dimensional map screen to be displayed on the display of the display unit 31. Then, when the display control data is received from the UAV monitoring server SA, the control unit 35 causes the UAV objects and the like to be displayed on the two-dimensional map screen, for example, as shown in FIG. 6.

Furthermore, when the display control data including the information urging caution from the UAV monitoring server SA, for example, as shown in FIG. 8, the control unit 35 causes the information urging caution to be displayed in association with the objects of the attention target UAVs n on the two-dimensional map screen. On the other hand, when the attention-free information is received, as shown in FIG. 11, the control unit 35 causes the attention-free information to be displayed in association with the UAV objects of UAVs n that are not a target of attention on the two-dimensional map screen.

Moreover, the control unit 35 causes the operation screen to be displayed on the display in accordance with the control application. The data constituting the operation screen may be received from the UAV monitoring server SA as appropriate. Incidentally, the control unit 35 may receive a web page from the UAV monitoring server SA when the URL of the web page including the data constituting the operation screen is specified by the web browser, and cause the operation screen to be displayed on the display of the display unit 31. Then, when an operation instruction pertaining to the flight control of the UAV n is received from the monitor via the operation unit 32 in the display state of the operation screen, control information according to the operation instruction is transmitted to the UAV monitoring server SA.

Moreover, when the receiving restriction data is received from the UAV monitoring server SA, the control unit 35 performs processing to restrict the reception of the operation instruction pertaining to the flight control for the UAV n with a relatively higher speed among the attention target UAVs n. In such processing, the control unit 35 grays out the operation icon corresponding to the UAV 1 with a relatively higher speed, as shown, for example, in the operation icon display unit 51 of the operation screen (b) shown in FIG. 12. As a result, since the grayed-out operation icon cannot be specified by the monitor with a mouse or finger, it is possible to prohibit the reception of the operation instruction pertaining to the flight control for the UAV n with a relatively higher speed.

2. Operation of UAV Monitoring System S

Figure 14:
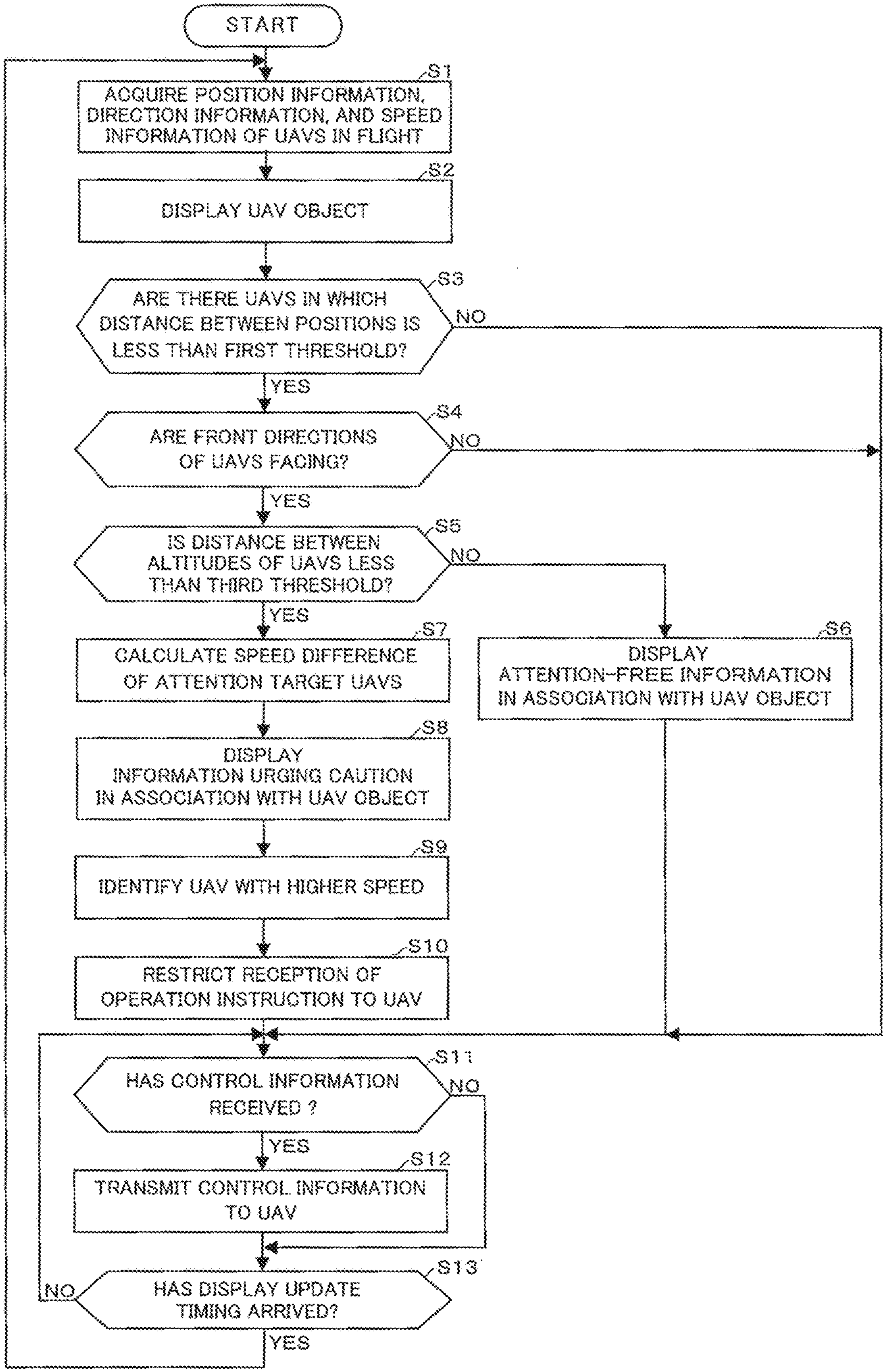
FIG. 14 is a flowchart illustrating an example of UAV monitoring processing of the control unit 23 in the UAV monitoring server SA.

Next, an operation of the UAV monitoring system S will be described with reference to FIG. 14. FIG. 14 is a flowchart illustrating an example of UAV monitoring processing of the control unit 23 in the UAV monitoring server SA. Incidentally, as a premise for the processing illustrated in FIG. 14, it is assumed that the monitor terminal T activates the monitor application and the control application, and displays the two-dimensional map screen on the display for the two-dimensional map screen, and also displays the operation screen on the display for the operation screen. When the processing illustrated in FIG. 14 is started, the control unit 23 acquires the position information, the direction information, and the speed information of each UAV n in flight (step S1). Here, the position information indicates the horizontal and vertical positions of each UAV n.

Next, the control unit 23 causes, based on the position information and the direction information acquired in step S1, the UAV object and the figure representing the front direction of the UAV n whose the coordinate position is included within the two-dimensional map screen to be displayed on the two-dimensional map screen on the display for the two-dimensional map screen (step S2). For example, as described above, the display control unit 235 transmits the display control data for displaying the UAV object and the figure representing the front direction to the monitor terminal T. As a result, the UAV object and the figure representing the front direction are displayed on the two-dimensional map screen. Incidentally, the display control data may include the vehicle ID of the UAV n corresponding to the UAV object (the same applies hereinafter).

Next, the control unit 23 determines, by the display control unit 235, whether there are two or more UAVs n in which the distance between the two-dimensional positions (i.e., horizontal positions) indicated by the respective position information is less than or equal to the predetermined first threshold value among the plurality of UAVs n whose the position information was acquired in step S1 (step S3). When it is determined that there are the two or more UAVs n whose the distance is less than or equal to the first threshold value (step S3: YES), the two or more UAVs n whose the distance is less than or equal to the first threshold value are identified, and the processing proceeds to step S4. On the other hand, when it is determined that there are no the two or more UAVs n whose the distance is less than or equal to the predetermined first threshold value (step S3: NO), the processing proceeds to step S11. Incidentally, in step S3, it may be determined whether there are the two or more UAVs n in which the distance between the coordinate positions of the plurality of UAVs n is less than or equal to a threshold value.

In step S4, the control unit 23 determines, by the display control unit 235, whether the front directions indicated by the respective direction information of the two or more UAVs n identified in step S3, as described above, are facing each other. When it is determined that the front directions are facing (step S4: YES), the two or more UAVs n (i.e., UAVs n whose the front directions are facing each other) are identified, and the processing proceeds to step S5. On the other hand, when it is determined that the front directions are not facing (step S4: NO), the processing proceeds to step S11.

In step S5, the control unit 23 determines whether the distance (i.e., the altitude difference) between the altitudes (i.e., the vertical positions) indicated by the respective position information of the two or more UAVs n identified in step S4 is less than or equal to the third threshold value. When it is determined that the altitude difference is not less than the third threshold value (step S5: NO), the processing proceeds to step S6. On the other hand, when it is determined that the altitude difference is equal to or less than the third threshold value (step S5: YES), the two or more UAVs n (i.e., UAVs n determined to be equal to or less than the third threshold value) are identified as the attention target UAVs n, and the processing proceeds to step S7.

In step S6, as described above, the control unit 23 causes the attention-free information to be displayed in association with the respective UAV objects on the two-dimensional map screen, and the processing proceeds to step S11. For example, the display control unit 235 transmits the display control data for displaying the attention-free information to the monitor terminal T. As a result, the attention-free information is displayed on the two-dimensional map screen in association with the respective UAV objects of the UAVs n determined that the altitude difference is not less than the third threshold value.

In step S7, the control unit 23 calculates, by the speed difference calculation unit 234, the speed difference of the attention target UAVs n on the basis of on the speed information of the attention target UAVs n identified in step S5. Next, as described above, the control unit 23 causes information urging caution to be displayed in association with the respective UAV objects on the two-dimensional map screen (step S8). For example, the display control unit 235 transmits the display control data for displaying the information urging caution to the monitor terminal T. As a result, the information urging caution is displayed in association with the respective UAV objects of the attention target UAVs n on the two-dimensional map screen. At this time, the control unit 23 may cause the figures of the display mode according to the speed difference between the attention target UAVs n in addition to the respective front directions and the respective speeds of the attention target UAVs n in association with the respective UAV objects of the attention target UAVs n on the two-dimensional map screen.

Next, the control unit 23 identifies the UAV n with a relatively higher speed among the attention target UAVs n on the basis of the speed information of the attention target UAVs n identified in step S5 (step S9). Next, the control unit 23 performs processing to restrict the reception of the operation instruction to the UAV n identified in step S9 (step S10). For example, the control unit 23 transmits, to the monitor terminal T, the receiving restriction data (including the vehicle ID of the UAV n identified in step S9) for restricting the reception of the operation instruction pertaining to the flight control for the UAV n identified in step S9. As a result, the operation icon corresponding to the relatively higher speed UAV n is grayed out, for example, on the operation screen displayed on the display for the operation screen.

In step S11, the control unit 23 determines whether control information according to an operation instruction by the monitor has been received from the monitor terminal T through the operation screen of the monitor terminal T. When it is determined that the control information according to the operation instruction has been received (step S11: YES), the control unit 23 transmits, by the flight control unit 236, the control information according to the operation instruction to the UAV n subject to the operation instruction (step S12), and the processing proceeds to step S13. As a result, the UAV n that has received the control information, for example, returns to the UAV base or lands in accordance with the control information. On the other hand, when it is determined that the control information according to the operation instruction has not been received (step S11: NO), the processing proceeds to step S13.

In step S13, the control unit 23 determines whether a preset display update timing has arrived. Here, the display update timing is set, for example, to arrive at predetermined time intervals (e.g., 0.01 seconds to 1 second). When it is determined that the preset display update timing has not arrived (step S13: NO), the processing returns to step S11. On the other hand, when it is determined that the preset display update timing has arrived (step S13: YES), the processing returns to step S1. As a result, the display of the UAV object, etc. of the UAV n in which the coordinate position is included in the two-dimensional map screen, is updated.

Incidentally, the processing in step S3 is configured to determine whether there are the two or more UAVs n in which the distance between the two-dimensional positions of the plurality of UAVs n is equal to or less than the first threshold value. However, it may be configured to determine whether there are the two or more UAVs n in which distance between the three-dimensional positions (i.e., positions determined from the positions in the horizontal direction and the positions in the vertical direction) of the plurality of UAVs n is less than or equal to the first threshold value. In this case, when it is determined in step S4 that the front directions are facing (step S4: YES), the two or more UAVs n (i.e., UAVs n whose the front directions are facing each other) are identified as the attention target UAVs n, and the processing proceeds to step S5, and the processing may proceed to step S7. That is, in this case, the processing of steps S5 and S6 may not be performed.

As described above, according to above embodiment, the UAV monitoring server SA acquires the position information indicating the position and the direction information indicating the front direction of each of the plurality of the UAVs n in flight, and in a case where the plurality of the UAVs n includes two or more UAVs n in which the distance between the positions indicated by the respective position information is less than or equal to the predetermined first threshold value and the front directions indicated by the respective direction information are facing each other, causes the information urging caution to be displayed in association with the respective UAV objects of the two or more UAVs n on the two-dimensional map screen. Thus, it is possible to notify the monitor of the information urging caution in a situation where it is determined that the possibility of a near miss or collision potential collision between the attention target UAVs n is higher. In other words, according to above embodiment, it is possible to prevent the monitor from being alerted more than necessary.

Moreover, the UAV n such as the drone is expected to fly more frequently and at a lower speed in a narrower area than an aircraft such as a passenger plane. Therefore, if, as in the prior art, a mark consisting of a triangle with three vertices, the first and second points corresponding to the respective UAV objects of two adjacent UAV n and another third point, is displayed, a plurality of the marks may overlap. This may result in a loss of visibility (i.e., ease of viewing) for the monitor. However, according to above embodiment, by having the configuration as described above, it is possible to particularly improve visibility for the monitor who monitors the flight statuses of the attention target UAVs n.

Incidentally, the above-described embodiment is one embodiment of the present invention, and the present invention is not limited to the above-described embodiment, changes from the above-described embodiment can be made on various configurations and the like within a scope not departing from the gist of the present invention, and such cases shall be also included in the technical scope of the present invention. In the above embodiment, the UAV monitoring server SA has been described as an example of the information processing device of the present invention, but the monitor terminal T may also be the information processing device. In this case, the control unit 35 of the monitor terminal T functions in the same way as the information acquisition unit 231, the direction information acquisition unit 232, the speed information acquisition unit 233, the speed difference calculation unit 234, the display control unit 235, and the flight control unit 236, described above, while communicating with the UAV monitoring server SA via communication network NW. For example, the control unit 35 of the monitor terminal T acquires the position information indicating the position and the direction information indicating the front direction of each of the plurality of the UAVs n in flight. Then, the control unit 35 of the monitor terminal T determines, in the plurality of UAVs n, whether there are two or more UAVs n in which a distance between the positions indicated by the respective position information is less than or equal to the predetermined first threshold value and the front directions indicated by the respective direction information are facing each other. In a case where it is determined that there are such two or UAVs n, the control unit 35 of the monitor terminal T causes the information urging caution to be displayed in association with the respective UAV objects of the two or more UAVs n on the two-dimensional map screen.

Moreover, the control unit 35 of the monitor terminal T may acquire the speed information indicating the respective speeds of the attention target UAVs n, and cause, based on the acquired speed information, the respective speed information of the UAVs n to be displayed in association with the respective UAV objects on the two-dimensional map screen. Moreover, the control unit 35 of the monitor terminal T may cause, in a case where the difference in the respective speeds of the attention target UAVs n is equal to or greater than the predetermined second threshold value, the speed information to be displayed in a display mode representing that there is the speed difference between the attention target UAVs n. Furthermore, in a case where the distance between the vertical positions of two or more UAVs n in which the distance between the horizontal positions is less than or equal to the first threshold value and the front directions are facing each other, is greater than the third threshold value, the control unit 35 of the monitor terminal T may cause the attention-free information to be displayed on the two-dimensional map screen. Incidentally, in the above embodiment, the UAV has been described as an example of the unmanned aerial vehicle, but the present invention is also applicable to a flying robot and the like.

Note

[1] An information processing device according to the present disclosure includes: a first acquisition unit configured to acquire position information indicating a position of each of a plurality of unmanned aerial vehicles in flight; a second acquisition unit configured to acquire direction information indicating a front direction of each of the plurality of unmanned aerial vehicles; and a display control unit configured to cause an object representing each of the plurality of unmanned aerial vehicles to be displayed on a two-dimensional map screen on the basis of the position information, wherein in a case where the plurality of unmanned aerial vehicles include two or more unmanned aerial vehicles in which a distance between the positions indicated by the respective position information is less than or equal to a predetermined first threshold value and the front directions indicated by the respective direction information are facing, the display control unit is configured to further cause information urging caution to be displayed in association with the object representing each of the two or more unmanned aerial vehicles on the two-dimensional map screen. This makes it possible to notify the monitor of the information urging caution in a situation where it is determined that the possibility of a near miss or collision potential collision between the unmanned aerial vehicles is higher.

[2] In the information processing device described in [1] above, the two or more unmanned aerial vehicles may be in a state such that virtual lines extending from the positions indicated by the respective position information toward the front direction indicated by the respective direction information intersect within a predetermined range. This makes it possible to quickly determine whether or not the respective unmanned aerial vehicles are facing each other.

[3] The information processing device described in [1] or [2] above, may further include a third acquisition unit configured to acquire speed information indicating a speed of each of the two or more unmanned aerial vehicles. The display control unit may be configured to further cause the speed information of each of the two or more unmanned aerial vehicles and the information urging caution to be displayed in association with the object representing each of the two or more unmanned aerial vehicles on the two-dimensional map screen. This makes it possible to visually inform the monitor of the degree of probability of near miss or potential collision between the unmanned aerial vehicles.

[4] The information processing device described in [3] above, may further include a calculation unit configured to calculate a difference in speed between the two or more unmanned aerial vehicles on the basis of the speed information. In a case where the difference in speed is equal to or greater than a predetermined second threshold value, the display control unit may be configured to further cause the speed information to be displayed in a display mode representing that there is a speed difference between the two or more unmanned aerial vehicles, and in a case where the difference in speed is less than the second threshold value, the display control unit may be configured to further cause the speed information to be displayed in a display mode representing that there is not a speed difference between the two or more unmanned aerial vehicles. This makes it possible to visually and intelligibly inform the monitor of the degree of probability of near miss or potential collision between the unmanned aerial vehicles.

[5] In the information processing device described in [3] above, the display control unit may be configured to further cause figures representing the front direction and the speed of each of the two or more unmanned aerial vehicles to be displayed in association with the object representing each of the two or more unmanned aerial vehicles on the two-dimensional map screen. This makes it possible to visually and intelligibly inform the monitor of the degree of probability of near miss or potential collision between the unmanned aerial vehicles.

[6] The information processing device described in [5] above, may further include a calculation unit configured to calculate a difference in speed between the two or more unmanned aerial vehicles on the basis of the speed information. In a case where the difference in speed is equal to or greater than a predetermined second threshold value, the display control unit may be configured to further control display sizes of the figures such that the display size of the figure associated with the object representing the unmanned aerial vehicle with a relatively higher speed is larger than the figure associated with the object representing the unmanned aerial vehicle with a relatively lower speed among the two or more unmanned aerial vehicles. In a case where the difference in speed is less than the second threshold value, the display control unit may be configured to further control display sizes of the figures such that the display size of the figures associated with the object representing each of the two or more unmanned aerial vehicles is the same size. This makes it possible to more visually and intelligibly inform the monitor of the degree of probability of near miss or potential collision between the unmanned aerial vehicles.

[7] In the information processing device described in [6] above, the second threshold value may be set in a plurality of levels and the display control unit may be configured to further control display sizes of the figures such that the difference in the display sizes of the figures increases as the difference in speed increases. This makes it possible to more visually and intelligibly inform the monitor of the degree of probability of near miss or potential collision between the unmanned aerial vehicles.

[8] In the information processing device described in any one of [1] to [7] above, the position information may indicate a horizontal position and a vertical position of each of the plurality of unmanned aerial vehicles. In a case where the plurality of unmanned aerial vehicles include two or more unmanned aerial vehicles in which the distance between the horizontal positions is less than or equal to a predetermined first threshold value, the distance between the vertical positions is less than or equal to a predetermined third threshold value, and the front directions are facing each other, the display control unit may be configured to further cause information urging caution to be displayed in association with the object representing each of the two or more unmanned aerial vehicles on the two-dimensional map screen. This makes it possible to effectively notify the monitor of the information urging caution in a situation where it is determined that the possibility of a near miss or collision potential collision between the unmanned aerial vehicles is even higher.

[9] In the information processing device described in [8] above, in a case where the distance between the vertical positions of the two or more unmanned aerial vehicles in which the distance between the horizontal positions is less than or equal to the first threshold value and the front directions are facing each other, is greater than the third threshold value, the display control unit may be configured to further cause information indicating that the caution is not required to be displayed on the two-dimensional map screen. Thus, even if the two or more unmanned aerial vehicles in which the distance between the horizontal positions is less than or equal to the first threshold value and the front directions are facing each other, are visible by the monitor on the two-dimensional map screen, it is possible to effectively inform the monitor of that the possibility of a near miss or collision between the unmanned aerial vehicles is low.

[10] The information processing device described in any one of [1] to [9] above, may further include a third acquisition unit configured to acquire speed information indicating a speed of each of the two or more unmanned aerial vehicles. The display control unit may be configured to further cause an operation screen to be displayed, the operation screen being for receiving an operation instruction pertaining to a flight control for the two or more unmanned aerial vehicles from an operator, and may restrict a reception of the operation instruction pertaining to the flight control for the unmanned aerial vehicle with a relatively higher speed among the two or more unmanned aerial vehicles. This allows efficient implementation of the flight control for the unmanned aerial vehicle, for which the flight control is easily effective.

[11] A display control method according to the present disclosure includes: acquiring position information indicating a position of each of a plurality of unmanned aerial vehicles in flight; acquiring direction information indicating a front direction of each of the plurality of unmanned aerial vehicles; causing an object representing each of the plurality of unmanned aerial vehicles to be displayed on a two-dimensional map screen on the basis of the position information; and causing information urging caution to be displayed in association with the object representing each of the two or more unmanned aerial vehicles on the two-dimensional map screen, in a case where the plurality of unmanned aerial vehicles include two or more unmanned aerial vehicles in which the distance between the positions indicated by the respective position information is less than or equal to a predetermined first threshold value and the front directions indicated by the respective direction information are facing.

Reference Signs List

1, 2 UAV
11 Drive unit
12 Positioning unit
13 Communication unit
14 Sensor unit
15 Storage unit
16 Control unit
21 Communication unit
22 Storage unit
23 Control unit
31 Display unit
32 Operation unit
33 Communication unit
34 Storage unit
35 Control unit
231 Position information acquisition unit
232 Direction information acquisition unit
233 Speed information acquisition unit
234 Speed difference calculation unit
235 Display control unit
236 Flight control unit
SA UAV monitoring server
T Monitor terminal
S UAV monitoring system

What is claimed is:

1. An information processing device comprising:

at least one memory configured to store program code; and at least one processor configured to access the program code and operate as instructed by the program code, the program code including:

first acquisition code configured to cause the at least one processor to acquire position information indicating a position of each of a plurality of unmanned aerial vehicles in flight;

second acquisition code configured to cause the at least one processor to acquire direction information indicating a front direction of each of the plurality of unmanned aerial vehicles; and display control code configured to cause the at least one processor to cause an object representing each of the plurality of unmanned aerial vehicles to be displayed on a two-dimensional map screen on the basis of the position information, wherein in a case where the plurality of unmanned aerial vehicles include two or more unmanned aerial vehicles in which a distance between the positions indicated by the respective position information is less than or equal to a predetermined first threshold value and the front directions indicated by the respective direction information are facing, the display control code is configured to cause the at least one processor to further cause information urging caution to be displayed in association with the object representing each of the two or more unmanned aerial vehicles on the two-dimensional map screen, the program code further including:

third acquisition code configured to cause the at least one processor to acquire speed information indicating a speed of each of the two or more unmanned aerial vehicles, wherein the display control code is configured to cause the at least one processor to further cause figures representing the front direction and the speed of each of the two or more unmanned aerial vehicles to be displayed in association with the object representing each of the two or more unmanned aerial vehicles on the two-dimensional map screen.

2. An information processing device according to claim 1, wherein the two or more unmanned aerial vehicles are in a state such that virtual lines extending from the positions indicated by the respective position information toward the front direction indicated by the respective direction information intersect within a predetermined range.

3. An information processing device according to claim 1, wherein the display control code is configured to cause the at least one processor to further cause the speed information of each of the two or more unmanned aerial vehicles and the information urging caution to be displayed in association with the object representing each of the two or more unmanned aerial vehicles on the two-dimensional map screen.

4. An information processing device according to claim 1, the program code further including calculation code configured to cause the at least one processor to calculate a difference in speed between the two or more unmanned aerial vehicles on the basis of the speed information, wherein in a case where the difference in speed is equal to or greater than a predetermined second threshold value, the display control code is configured to cause the at least one processor to further cause the speed information to be displayed in a display mode representing that there is a speed difference between the two or more unmanned aerial vehicles, and in a case where the difference in speed is less than the second threshold value, the display control code is configured to cause the at least one processor to further cause the speed information to be displayed in a display mode representing that there is not a speed difference between the two or more unmanned aerial vehicles.

5. An information processing device according to claim 1, the program code further including calculation code configured to cause the at least one processor to calculate a difference in speed between the two or more unmanned aerial vehicles on the basis of the speed information, wherein in a case where the difference in speed is equal to or greater than a predetermined second threshold value, the display control code is configured to cause the at least one processor to further control display sizes of the figures such that the display size of the figure associated with the object representing the unmanned aerial vehicle with a relatively higher speed is larger than the figure associated with the object representing the unmanned aerial vehicle with a relatively lower speed among the two or more unmanned aerial vehicles, in a case where the difference in speed is less than the second threshold value, the display control code is configured to cause the at least one processor to further control display sizes of the figures such that the display size of the figures associated with the object representing each of the two or more unmanned aerial vehicles is the same size.

6. An information processing device according to claim 5, wherein the second threshold value is set in a plurality of levels and the display control code is configured to cause the at least one processor to further control display sizes of the figures such that the difference in the display sizes of the figures increases as the difference in speed increases.

7. An information processing device according to claim 1, wherein the position information indicates a horizontal position and a vertical position of each of the plurality of unmanned aerial vehicles and in a case where the plurality of unmanned aerial vehicles include two or more unmanned aerial vehicles in which the distance between the horizontal positions is less than or equal to a predetermined first threshold value, the distance between the vertical positions is less than or equal to a predetermined third threshold value, and the front directions are facing each other, the display control code is configured to cause the at least one processor to further cause information urging caution to be displayed in association with the object representing each of the two or more unmanned aerial vehicles on the two-dimensional map screen.

8. An information processing device according to claim 7, wherein in a case where the distance between the vertical positions of the two or more unmanned aerial vehicles in which the distance between the horizontal positions is less than or equal to the first threshold value and the front directions are facing each other, is greater than the third threshold value, the display control code is configured to cause the at least one processor to further cause information indicating that the caution is not required to be displayed on the two-dimensional map screen.

9. A display control method executed by one or more computers, comprising:

acquiring position information indicating a position of each of a plurality of unmanned aerial vehicles in flight;

acquiring direction information indicating a front direction of each of the plurality of unmanned aerial vehicles;

causing an object representing each of the plurality of unmanned aerial vehicles to be displayed on a two-dimensional map screen on the basis of the position information; and causing information urging caution to be displayed in association with the object representing each of the two or more unmanned aerial vehicles on the two-dimensional map screen, in a case where the plurality of unmanned aerial vehicles include two or more unmanned aerial vehicles in which the distance between the positions indicated by the respective position information is less than or equal to a predetermined first threshold value and the front directions indicated by the respective direction information are facing, the method further comprising:

acquiring speed information indicating a speed of each of the two or more unmanned aerial vehicles; and causing figures representing the front direction and the speed of each of the two or more unmanned aerial vehicles to be displayed in association with the object representing each of the two or more unmanned aerial vehicles on the two-dimensional map screen.

10. An information processing device comprising:

at least one memory configured to store program code; and at least one processor configured to access the program code and operate as instructed by the program code, the program code including:

first acquisition code configured to cause the at least one processor to acquire position information indicating a position of each of a plurality of unmanned aerial vehicles in flight;

second acquisition code configured to cause the at least one processor to acquire direction information indicating a front direction of each of the plurality of unmanned aerial vehicles; and display control code configured to cause the at least one processor to cause an object representing each of the plurality of unmanned aerial vehicles to be displayed on a two-dimensional map screen on the basis of the position information, wherein in a case where the plurality of unmanned aerial vehicles include two or more unmanned aerial vehicles in which a distance between the positions indicated by the respective position information is less than or equal to a predetermined first threshold value and the front directions indicated by the respective direction information are facing, the display control code is configured to cause the at least one processor to further cause information urging caution to be displayed in association with the object representing each of the two or more unmanned aerial vehicles on the two-dimensional map screen, the program code further including:

the program code further including third acquisition code configured to cause the at least one processor to acquire speed information indicating a speed of each of the two or more unmanned aerial vehicles, wherein the display control code is configured to cause the at least one processor to further cause an operation screen to be displayed, the operation screen being for receiving an operation instruction pertaining to a flight control for the two or more unmanned aerial vehicles from an operator, and cause the at least one processor to restrict a reception of the operation instruction pertaining to the flight control for the unmanned aerial vehicle with a relatively higher speed among the two or more unmanned aerial vehicles.

* * * * *